United States Patent
Brown

[11] 3,977,242
[45] Aug. 31, 1976

[54] FORCE MEASURING RESONATOR
[76] Inventor: Horace D. Brown, 9317 SW. 93 Terrace, Miami, Fla. 33176
[22] Filed: Mar. 14, 1975
[21] Appl. No.: 558,554

[52] U.S. Cl............................ 73/141 R; 73/DIG. 1; 73/67.1
[51] Int. Cl.²......................................... G01L 1/00
[58] Field of Search.................. 73/67.1, 67.2, 70.2, 73/141 R, 141 A, 517 AV, DIG. 1

[56] References Cited
UNITED STATES PATENTS

| | | | |
|---|---|---|---|
| 2,695,517 | 11/1954 | Wiggins .............................. | 73/67.1 |
| 2,808,581 | 10/1957 | Findlay .......................... | 73/290 V X |
| 3,287,720 | 11/1966 | Chambers, III et al. ......... | 73/70.2 X |

*Primary Examiner*—Charles A. Ruehl

[57] ABSTRACT

A force measuring apparatus having a vibrator which resonates with the frequency of a vibration generator. The force to be measured is applied directly to the vibrator in a manner to effectively tune it to the frequency of the generator. The vibrating motions of the vibrator are transmitted to a transducer which converts them to an electric signal which in turn is fed into a readout device.

4 Claims, 10 Drawing Figures

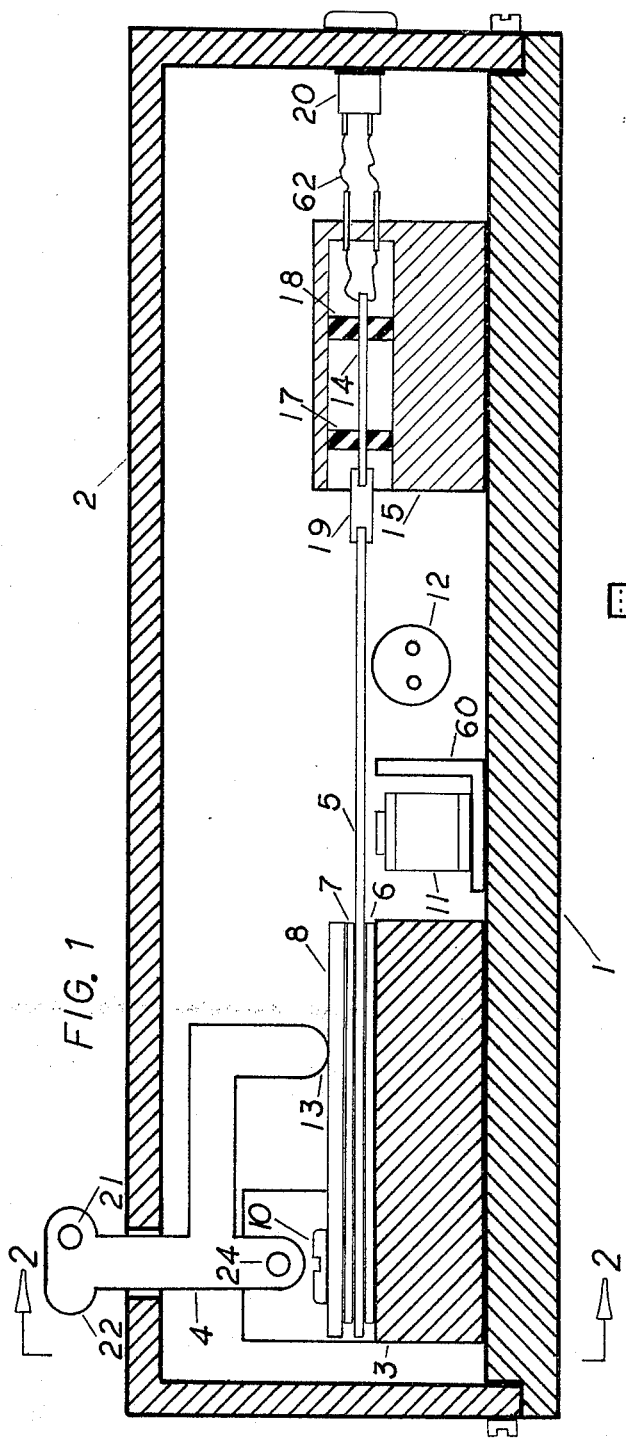
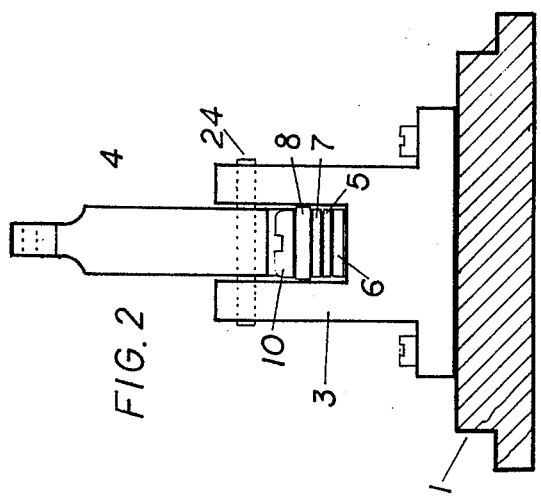

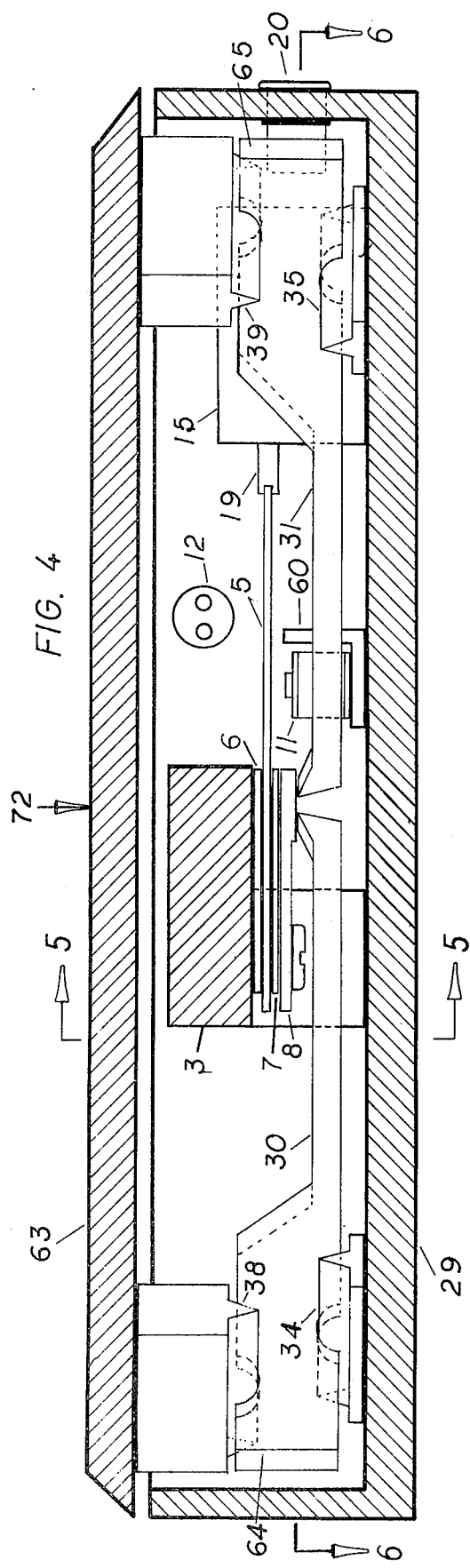
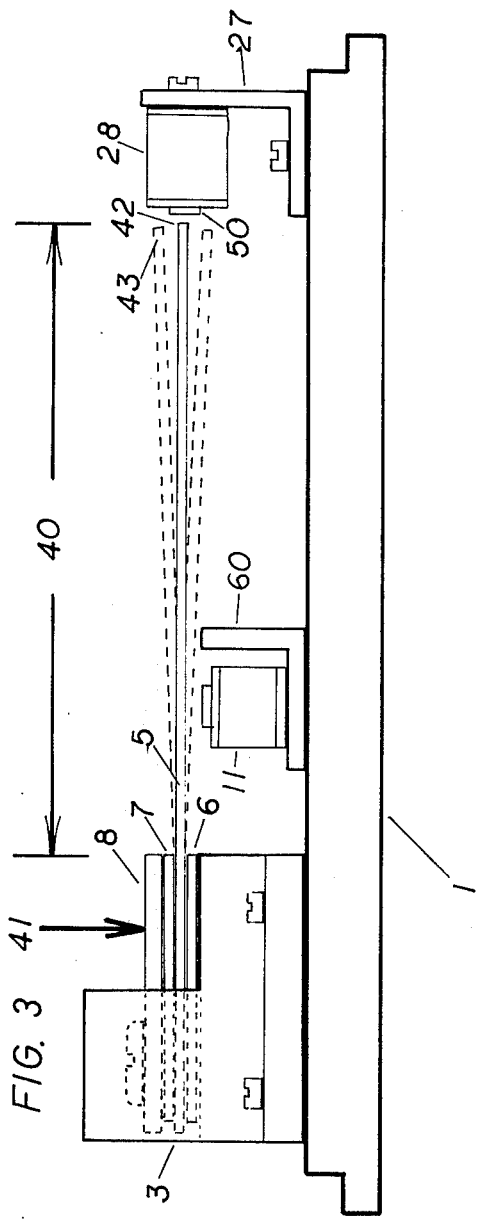

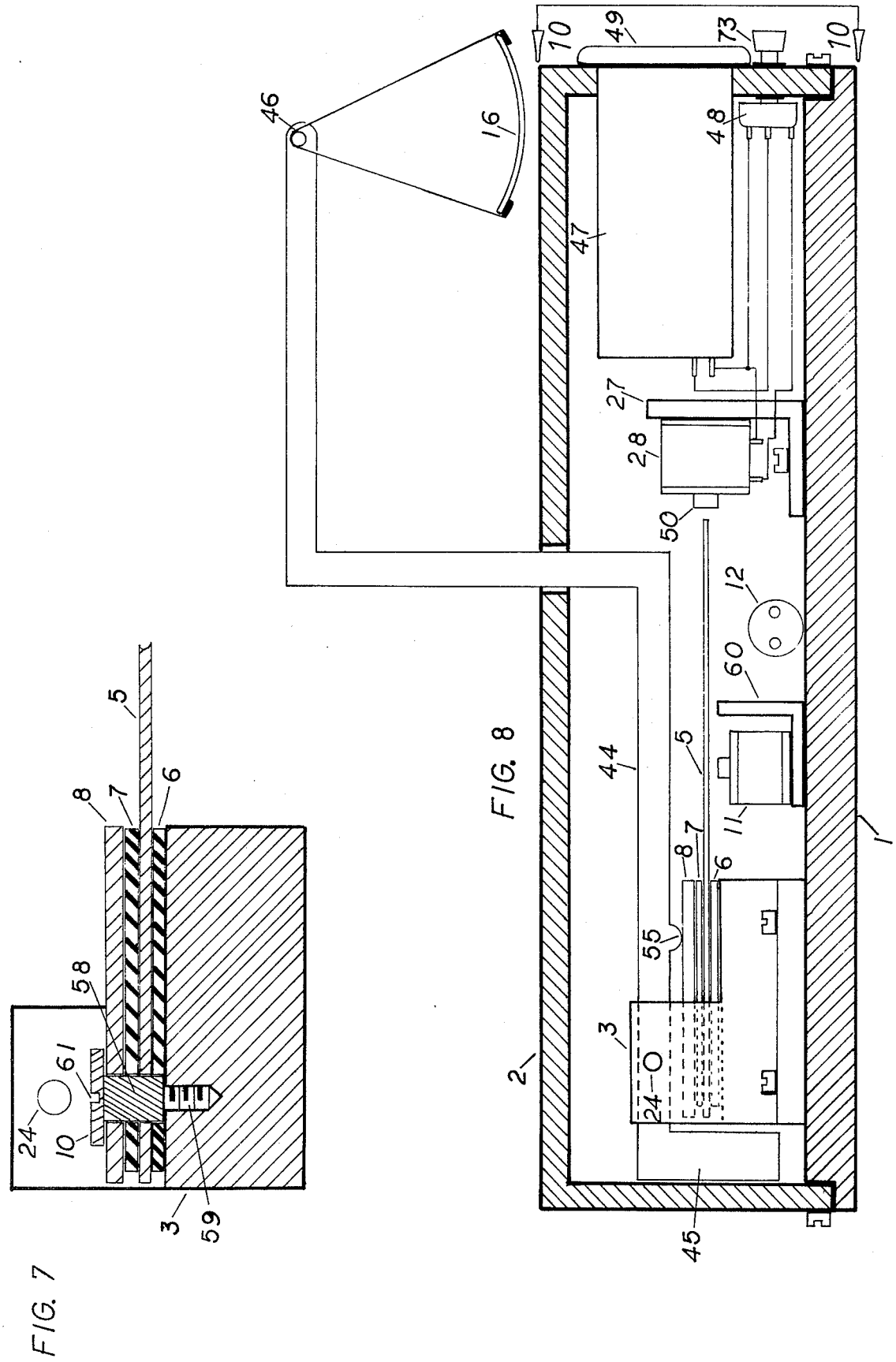

FORCE MEASURING RESONATOR

This application relates to pending application Ser. No. 533,345, filed 12-16-74 and to force measuring devices in general, including weighing mechanisms and barometric pressure indicators such as altimeters and more particularly to force measuring apparatus which employ a vibrator. Heretofore devices of this type have utilized the technique of exerting force against a vibrating element to either damp the vibrations or to change the frequency thereof and reading the reduced amplitude or the changing frequency as an indication of change in force magnitude. The present invention operates on a principle diametrically opposite to the damping technique and totally different from the frequency modulation method. As will be shown in the following specification and drawing the vibratory element employed, unlike those used in the above referenced devices, does not vibrate under normal conditions but BEGINS to vibrate in response to the application of a very small amount of force and will vibrate at an increased intensity as the magnitude of the applied force is increased.

The main object is to provide a means for converting weight, force or pressure directly into an electric signal which can be visually indicated on an electric measuring device such as a meter or digital readout instrument, locally or remotely, amplified, recorded, fed into a computer, or used to control other equipment.

A further object of this development is to provide an apparatus which accomplishes its intended purpose with a high degree of accuracy and reliability by means of a simplified, compact, and economically feasible structure.

The purpose and objects of the invention are clearly set forth in the following specification and accompanying drawings, in which:

FIG. 1 is a general cross section view in front elevation.

FIG. 2 is a cross section side view taken on the lines 2—2 of FIG. 1.

FIG. 3 is a diagramatic view in front elevation illustrating the basic principles of the invention.

FIG. 4 is a cross section front elevation showing the application of the invention to a weighing scale.

FIG. 7 is a detail front view in cross section of the vibrator support frame.

FIG. 8 is a cross sectional view of the adaptation of the invention to a prescription type weighing scale.

Figure 5:
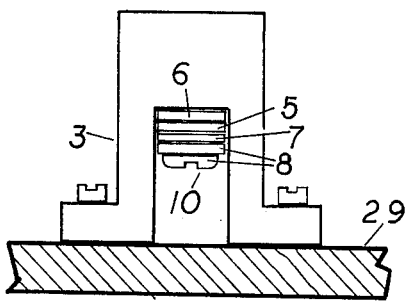
FIG. 5 is a detail showing the vibrator support frame taken on the lines 5—5 of FIG. 4.
Figure 6:
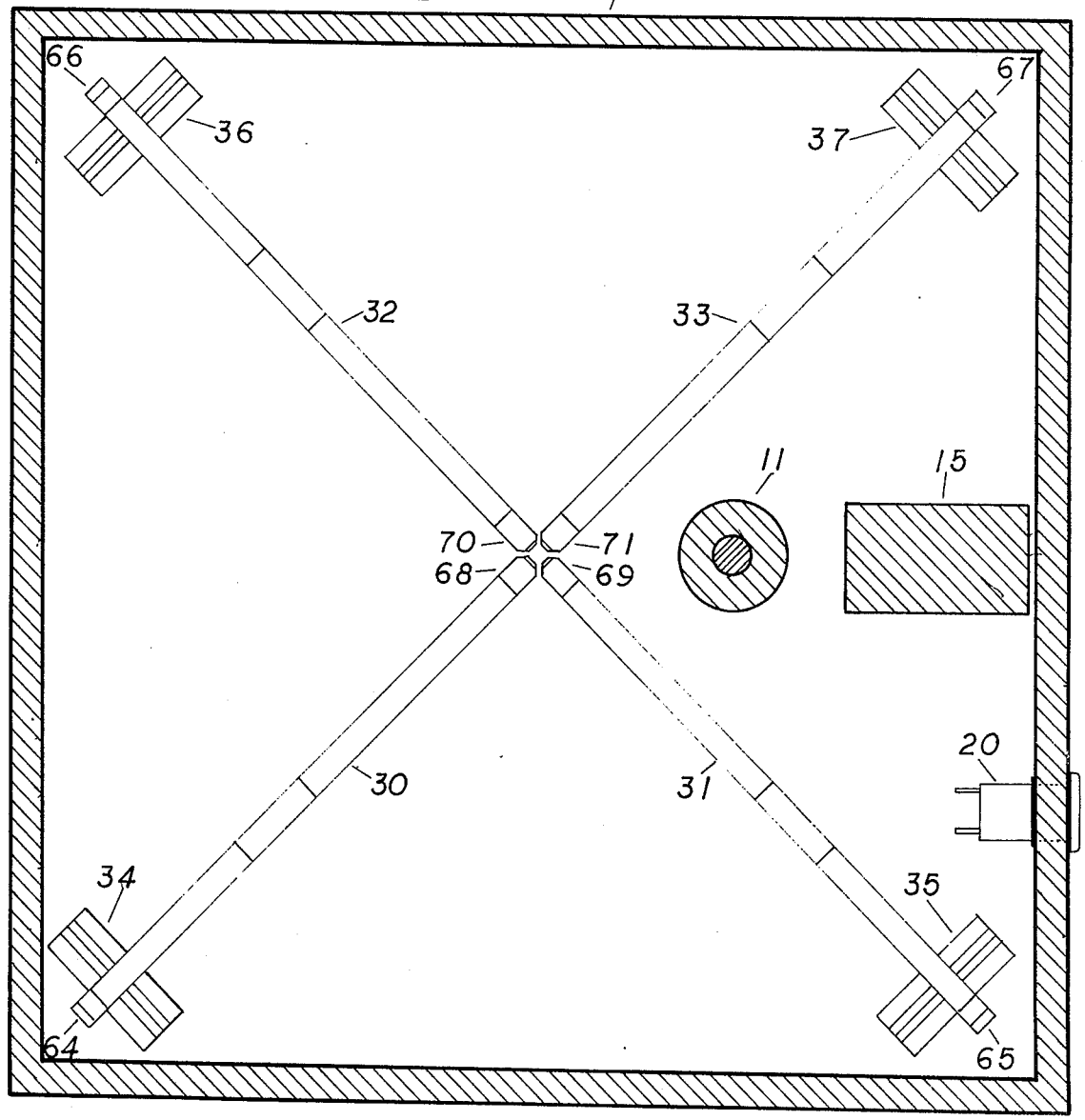
FIG. 6 is a cross sectional top plan view taken on the lines 6—6 of FIG. 4.

Like numerals indicate like parts throughout the several views in which a base plate 1, FIG. 1, forms the main support for the various elements of the mechanism. A housing 2 incloses the invention and is secured to the base plate 1. A transducer case 15 is secured to the base 1. A piezoelectric crystal 14, which may be a natural quartz crystal or one of a variety of natural or synthetic piezoelectric substances, is supported within case 15 by semiresilient blocks, 17 and 18. The left end of crystal 14 is coupled to the extended right end of a cantilevered vibrator 5 by an interposing elastic bushing 19. The vibrator 5 is resiliently mounted at its left end by a shoulder screw 10 to a support frame 3 as shown in FIG. 1 and in the enlarged detail in FIG. 7. The shoulder 58 of screw 10 passes freely through a pressure plate 8, a resilient separator 7, the vibrator 5 and a second resilient separator 6, and the threaded end 59 thereof screws firmly into the support frame 3. Shoulder 58 serves as a spacer between the slotted head 61 of screw 10 and frame 3 and thus provides a nonrigid clamp for the elements 5, 6, 7 and 8.

Still referring to FIG. 1 an electromagnet 11 is anchored via an L shaped bracket 60 to base 1. The coil of the electromagnet 11 terminates in a power receptacle 12 mounted in the rear side wall of housing 2. A lever arm 4 hinges on pin 24 within frame 3 and bears at one end 13 against pressure plate 8. A verticle portion of arm 4 extends through the top of housing 2 and exhibits an eye 21 and an abutment 22.

The principle of the invention is diagrammatically demonstrated in FIG. 3. Juxtaposed beneath the vibrator 5 is the electromagnet 11. When the device is in normal use the electromagnet 11 is energized by an alternating current having a constant frequency. The length 40 of vibrator 5 is designed to resonate at the said constant frequency of the exciter current flowing through electromagnet 11. For the vibrator 5 to resonate at the said frequency, however, it must be rigidly clamped between pressure plate 8 and frame 3 so as to leave only the resonant length 40 free to vibrate. But under normal conditions the vibrator 5 does not resonate since it is not rigidly clamped. If a force 41 is applied to pressure plate 8 the vibrator 5 will thereby be squeezed between plate 8 and frame 3 and is thus effectively shortened and will instantly vibrate at the frequency of the said excitor current. The intensity of the vibrations will increase as the magnitude of the force is increased.

With continued reference to FIG. 3, a frame 27 is secured to base 1 and supports a coil 28. A magnet 50 penetrates the core of coil 28 and is secured to frame 27. When vibrator 5 vibrates, shown in exaggeration 43, the end 42 moves in the magnetic field of magnet 50, and since the said magnetic field cuts through coil 28 the fluctuations in the field induced by the motions of vibrator 5 cause a voltage to be developed in said coil. The ends of coil 28 terminate in an output jack 20 and may thereby be connected though external cable means to indicating devices or other equipment. The magnetic transducer of FIG. 3 is shown as an alternative to the piezoelectric transducer of FIG. 1.

Referring again to FIG. 1, a tension force may be connected to lever arm 4 via the eye 21, or a compression force may be applied against the abutment 22, and as the said force is exerted against said lever it is transferred via end 13 to pressure plate 8. In the same manner as was described above, the force thus applied to plate 8 squeezes vibrator 5 and causes said vibrator to vibrate at a intensity corresponding to the amount of applied force. The vibrations thus induced into vibrator 5 are transmitted via the elastic coupling 19 to crystal 14 and cause a piezoelectric signal to develop within said crystal. The signal output of said crystal is connected to the output jack 20 via the interconnecting pair of wires 62 and may from there be relayed to an external indicating device or the like.

FIGS. 4 and 5 illustrate the application of the present invention to a weighing scale. Transducer case 15 and electromagnet 11 are mounted in the same manner as is shown in FIG. 1, but the vibrator support frame 3 is inverted. Vibrator 5 and elements 6, 7 and 8 are resiliently mounted in the inverted frame 3 in the same manner as is described above in FIG. 1. A base housing 29 supports the elements of the invention, to which is secured four knife-edge fulcrums 34, 35, 36 and 37 (36 and 37 not visible in FIG. 4). Four equal armed lever arms 30, 31, 32, and 33 (32 and 33 not visible in FIG. 4) pivot on fulcrums 34, 35, 36 and 37, respectively, and extend diagonally toward the center of base 29, the opposite ends 68, 69, 70 and 71 thereof being juxtaposed beneath pressure plate 8. A weighing table 63 has secured to its under side four knife edge load bearers 38 and 39 (two rear ones not visible) engaging the load ends 64, 65, 66 and 67, respectively, of lever arms 30, 31, 32 and 33. When a load 72 is placed on table 63 the weight is consequently applied via the four said load bearers 38, 39 (two not visible) to the load ends 64, 65, 66 and 67 of lever arms 30, 31, 32 and 33, respectively, thereby pivoting the said four lever arms and causing the effort ends 68, 69, 70 and 71 to abut against pressure plate 8 with a force which corresponds to the magnitude of the said load and to the mechanical advantage available in the said levers. The force thus applied to plate 8 squeezes vibrator 5 in the same manner described above and the resultant vibrations induced into said vibrator generate a voltage in crystal 14 which corresponds in intensity to the magnitude of the said load. The said generated voltage is terminated in the output jack 20 and may be relayed via additional external wiring to appropriately calibrated indicators.

Figure 10:
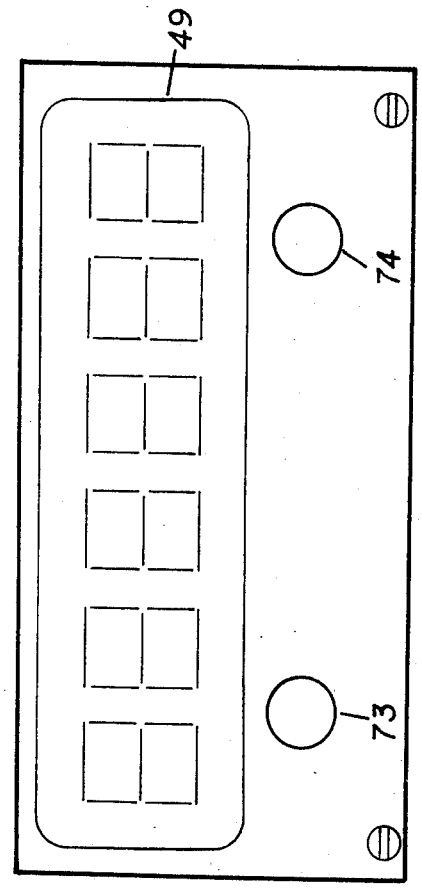
FIG. 10 is a front view taken on the lines 10—10 of FIGS. 8 and 9.

FIG. 8 is an example of a sensitive version of the invention for such applications as prescription scales. A lever arm 44, having a counter balance 45 and an abutment 55, said abutment engaging pressure plate 8, provides a mechanical advantage for weighing light weight objects. A weighing basket 16 swings on pin 46. The transducer 28 output is fed via an attenuator 48 to an internal digital voltmeter 47. FIG. 10, viewed on the lines 10—10 of FIG. 8 reveals the face of the digital instrument, as well as a convenient on-off switch 74, and the control knob 73 which is used for zero adjustment of the readout.

Figure 9:
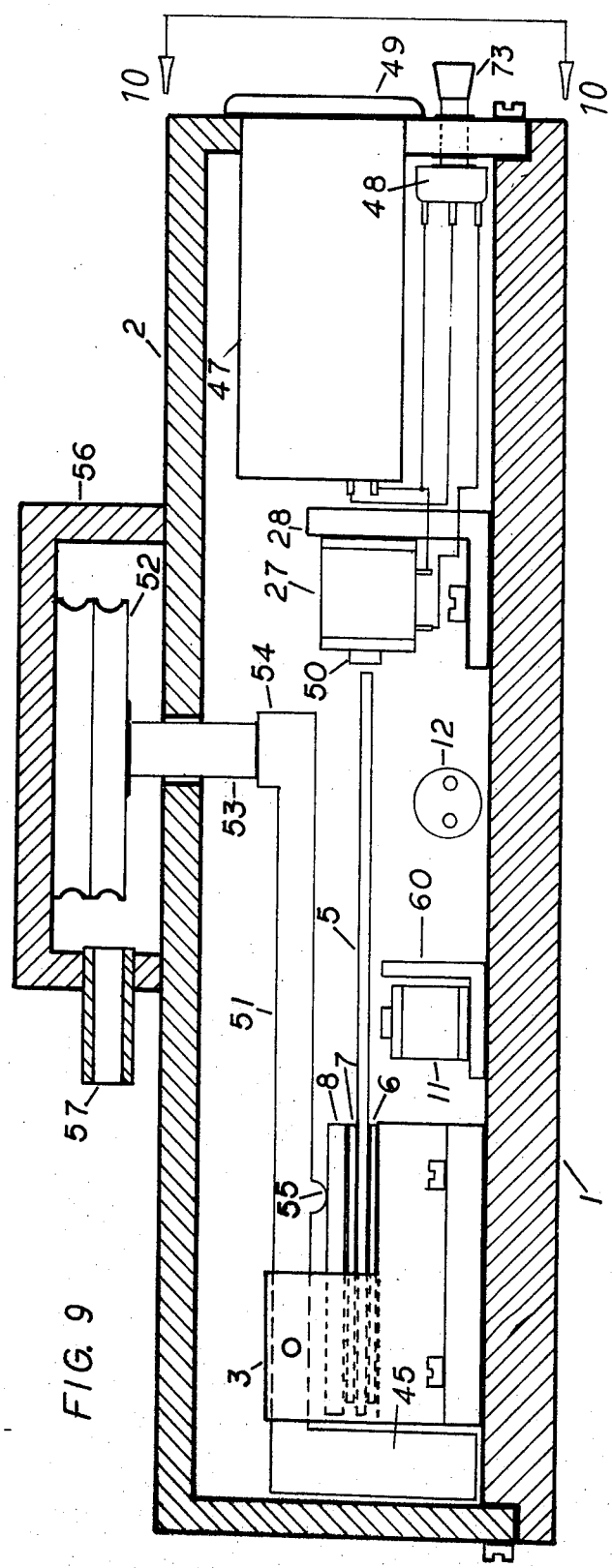
FIG. 9 is a cross section of an altimeter employing the present invention.

FIG. 9 is similar to FIG. 8, except for the modified lever arm 51. A secondary housing 56 is secured to base housing 2. A barometric pressure diaphragm 52 is anchored to the top inside of housing 56, the bottom 53 of which engages the top end 54 of lever 51. A static air pressure opening 57 is provided in the side wall of housing 56 and may be extended by common hose means to connect to the static air tube of an aircraft. Diaphragm 52, being evacuated, under normal circumstances would expand and contract with variations in the ambient barometric pressure. But since the said diaphragm is firmly captive between the top of housing 56 and the end 54 of lever 51 its movement is thereby inhibited and its internal and external pressure differentials only cause a change in the pressure applied to the end 54 of lever 51. This varying atmospheric pressure is consequently applied to pressure plate 8 via abutment 55 and alters the resonant condition of vibrator 5 in the same manner as has been fully described above. The varying intensity of vibrations induced into vibrator 5 by the changing atmospheric pressure varies the voltage induced into the transducer 28, the output of which is fed via attenuator 48 into the built-in digital voltmeter 47.

The voltmeter 47 is a commercially available instrument and has integral provisions for rectifying the AC output of the transducer of the present invention, an analog to digital converter which interprets the rectified analog signal in terms of voltage units and displays this information on the digital readout face of the instrument as shown in FIG. 10. Since the signal developed in transducer coil 28 is a product of the atmospheric pressure applied to the vibrator 5 via diaphragm 52 and lever arm 51, the meter 47, may be calibrated to indicate any desirable unit of atmospheric pressure and may therefore be used as a common barometer or altimeter. The attenuator 48 may be adjusted externally by means of control knob 72 for corrections of barometric pressure differentials. This specification and accompanying drawing has illustrated that the tendency of a vibratory element to vibrate at its natural resonant frequency can be controlled in a manner so that its vibrating intensity will track a varying force magnitude. One preferred embodiment of this phenomenon has been shown, but other embodiments have been constructed and successfully tested by the applicant, and still others are contemplated which do not depart from the principle of the invention as set forth in the following claims:

I claim:

1. A force sensor comprising: support means, a vibratory element mounted on said support means and maintained normally in a nonresonant condition, a vibrator exciter means secured relative to said support means in spaced relation to said vibratory element, a force bearing means, resilient means interposed between said force bearing means and said vibratory element to alter the said nonresonant condition of said vibratory element to a varying degree of resonance and consequent varying intensity of vibration which will track a varying magnitude of force applied to said force bearing means.

2. A force measuring mechanism comprising: support means, a vibrator means mounted on said support means, a vibrator exciter means secured relative to said support means in spaced relation to said vibrator means, a transducer means secured relative to said support means in spaced relation to said vibrator means, said transducer means being responsive to the vibrating motions of said vibrator means to produce an electric signal which corresponds in voltage magnitude to the intensity of said vibrating motions, force applicator means, resilient separator means interposed between said force applicator means and said vibrator means and engaging said applicator means and said vibrator means to alter the normally nonresonant condition of said vibrator means to a varying degree of resonance and consequent varying intensity of vibration which will correspond to variations in the magnitude of force applied to said applicator means, and electric indicating means responsive to said electric signal to visually display said signal in terms relative to units of said force.

3. The force measuring mechanism as set forth in claim 2 including: barometric pressure sensitive means secured relative to said support means in spaced relation to said applicator means and engaging said applicator means to bring to bear atmospheric pressure upon said applicator means.

4. The force measuring mechanism as set forth in claim 2 including: a load bearing means such as a table or basket secured relative to said support means in spaced relation to said applicator means and engaging said applicator means to bring to bear a load or force upon said applicator means.

* * * * *